W. A. PUNGS.
SPRAYER.
APPLICATION FILED JAN. 18, 1913.

1,079,721.

Patented Nov. 25, 1913.

WITNESSES
Robert N. VanBehring
Virginia C. Spratt

INVENTOR
William A. Pungs
BY
Rahemond A. Parker
ATTORNEY

UNITED STATES PATENT OFFICE.

WILLIAM A. PUNGS, OF DETROIT, MICHIGAN.

SPRAYER.

1,079,721.  Specification of Letters Patent.  Patented Nov. 25, 1913.

Application filed January 18, 1913. Serial No. 742,793.

*To all whom it may concern:*

Be it known that I, WILLIAM A. PUNGS, a citizen of the United States, residing at Detroit, county of Wayne, State of Michigan, have invented a certain new and useful Improvement in Sprayers, and declare the following to be a full, clear, and exact description of the same, such as will enable others skilled in the art to which it pertains to make and use the same, reference being had to the accompanying drawings, which form a part of this specification.

This invention relates to sprayers and has for its object a spraying device which is adapted to mix a poisonous solution with a stream of water such as is used in a garden hose or other water line. The device is effective for the purpose for which it is intended, is compact in arrangement and economical to manufacture.

The points of novelty and the advantageous features will more fully appear in the specification following.

Figure 1:
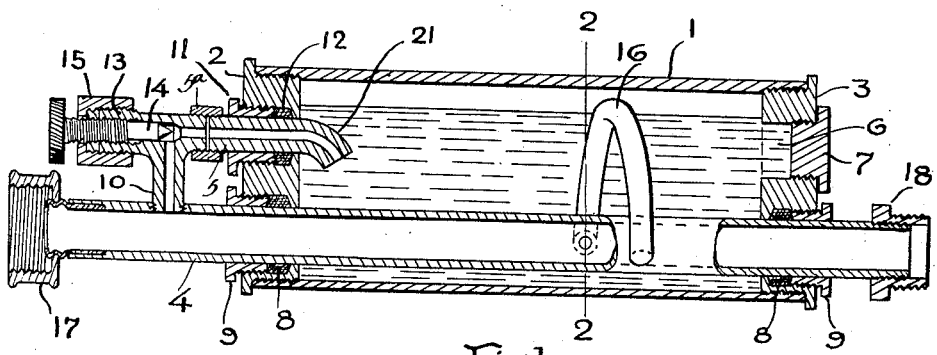
Figure 2:
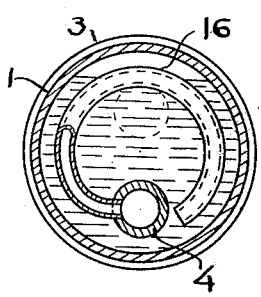
Figure 3:
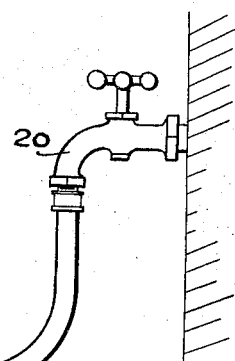
Figure 3:
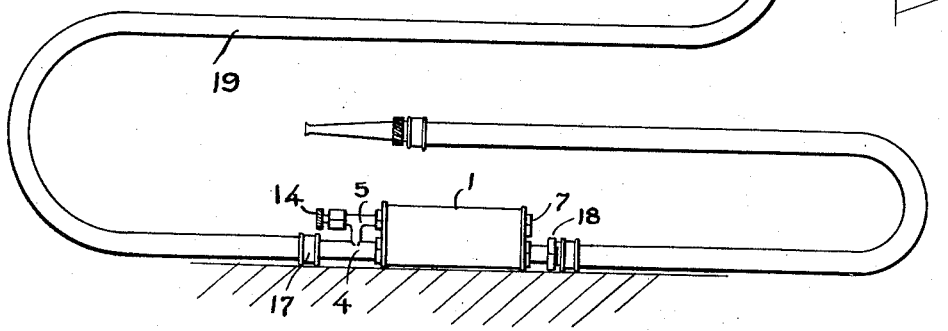

In the drawings:—Figure 1, is a longitudinal section of the mixing device. Fig. 2, is a cross section on the line 2—2 of Fig. 1. Fig. 3, is an elevation of the sprayer attached to a faucet.

A container 1 of cylindrical form is provided and is internally screw-threaded at each end. Into these threads screws, at each end, an end piece, one of which is indicated on the drawings as 2 and the other as 3. The end piece 2 is threaded at two places and has an opening clear through at these locations. The one opening is for the passage of the pipe 4, the other opening is for the passage of the branch or elbow pipe 5. The end piece 3 has two openings, each of which is partially screw-threaded. The opening 6 is closed by a screw plug 7 and this opening is for the introduction of the solution which is normally contained in the container. The other opening is in line with a similar opening of the end piece 2 and is intended for the passage of the pipe 4. Each of these openings in the end pieces for the passage of the pipe 4 contains a packing ring 8 and a threaded sleeve or nut 9 by which the pipe 4 may be securely held in place and packed with respect to the end pieces to prevent leakage of the solution in the container. The branch pipe or elbow 5 has two portions that are disposed at substantially right angles. One portion is screw-threaded as at 10 to screw into the side of the pipe line 4 and to divert part of the water therefrom. The other portion fits into the hole of the end piece 2 and is secured therein by a nut 11 and packed to prevent leakage by the packing ring 12. This elbow 5 has an externally and internally screw-threaded extension 13 that acts as a valve casing and into which screws the needle valve 14 that regulates the passage of the elbow at the angle of the conduit. A cap 15 screws over the end of the extension or valve casing.

A goose neck or a receiving pipe 16 of small bore is connected with the pipe 4 at about its midpoint and serves to take some of the solution out of the container and introduce it into the pipe 4. The solution contained in the container 1 may be a solution of arsenic of lead, sulfur of lime or any other insecticide. This solution is introduced into the container through the opening 6 by the removal of the screw-plug 7. The pipe 4 is provided with a swiveling coupling 17 at one end and a threaded coupling 18 at the other, so that it may be attached to a hose line 19 that is connected with a faucet or cock 20 of the city water mains. The water under pressure passes through the hose 19 and into the pipe 4 where part of it enters the elbow 5 and forces its way into the container. The passage of the elbow 5 is very much smaller than the passage of the pipe 4 and it is regulable by the valve 13. This puts the solution in the container 1 under pressure and forces it out gradually through the goose neck or receiving pipe 16 into the main water line. It will readily be seen that the rapidity at which the solution is driven from the container 1 may be regulated by the needle valve 14 so that it is not exhausted too quickly, but at the same time is uniformly forced into the main water line where it mixes with the water passing therethrough and poisons it to make it an effective agent for exterminating insects and other injurious things that infest trees, shrubberies, etc.

One of the features of this invention is that the full pressure of the city mains may be utilized in the hose and one has the convenience of sprinkling the city water and at the same time the advantage of being able to contaminate the water so as to make it a spraying solution to kill insects and the like.

The pipe 4 places the center of gravity of the container 1 somewhere near the pipe 4 and below the axis of the container, as shown in Fig. 1, hence the container will lie on the ground in about the position shown in Figs. 1 and 3 and it may be dragged about with the user as he moves about the lawn or on the ground. The goose neck 16 prevents the solution running out when the device is not in use, for it will readily be seen that when the water is turned off at the faucet very little of the solution can run out into the pipe 4 by reason of the curvature of the goose neck 16.

In connection with the maintenance of the container in the position shown in the drawings and with the elbow pipe 5 near the top of the container, I employ a curved end 21 on the elbow pipe for the purpose of directing the incoming water under pressure toward the bottom of the container to stir up the heavy particles of the solution which are liable to seek the bottom and which otherwise might not be properly mixed and forced out into the main pipe.

In order to make the different parts capable of assembly, I make the elbow in two portions whose adjacent ends are pipe-threaded and a coupling nut 5ª is adapted to screw onto these pipe-threaded ends by reason of being itself pipe-threaded. They are, therefore, joined in a water-tight union. This allows the bent pipe 21 to be passed through the end piece 2 from the inside before the end piece is screwed to the container.

What I claim is:—

1. In a sprayer, a mixing device, having in combination, a container provided with screw-threaded ends, end pieces screwed into the ends and containing openings, a pipe line passing through the openings of the end pieces and through the container, a branch pipe tapping the main pipe exterior of the container and passing through another opening in one of the end pieces, an intake pipe of restricted diameter inclosed by the container and leading into the main water line and a cap member in one of the end pieces for acting as a closure for an opening therein adapted for the introduction of the solution, substantially as described.

2. In a sprayer, a mixing device, having in combination, a cylindrical container, a pipe leading therethrough eccentrically and near the periphery of the cylinder so as to locate the center of gravity at one side of the container for the purpose of keeping the container in a given position when on the ground, a controllable branch pipe of smaller bore than the main pipe tapping said main pipe at a point exterior of said pipe and leading into the interior of the container, and a receiving pipe of smaller bore than the main pipe and leading into the main pipe from the interior of the container, the said receiving pipe being in the form of a goose-neck and having its opening on the side of the container that normally lies against the ground by reason of the eccentric disposition of the main pipe, substantially as described.

3. In a sprayer, a mixing device, having in combination, a cylindrical container, a main pipe leading therethrough eccentrically and near the periphery at one side of the container for the purpose of placing the center of gravity near the periphery at that side so that the container will remain in a given position when on the ground, a controllable branch pipe of smaller bore leading from the main pipe into the container and having a curved end that directs the incoming fluid toward the side of the container that is normally the bottom by reason of the maintenance of the container in a given position by the disposition of the main pipe through the container, and a receiving pipe of smaller bore than the main pipe and leading thereinto, the said receiving pipe being arranged with respect to the side of the container that is normally adjacent the ground so that the contents of the container will not be drawn off when the pressure on the liquid is discontinued, substantially as described.

In testimony whereof, I sign this specification in the presence of two witnesses.

WILLIAM A. PUNGS.

Witnesses:
STUART C. BARNES,
VIRGINIA C. SPRATT.